C. A. HIRTH.
BAND KNIFE SPLITTING MACHINE.
APPLICATION FILED AUG. 16, 1909.

1,033,892.

Patented July 30, 1912.

UNITED STATES PATENT OFFICE.

CARL ALBERT HIRTH, OF STUTTGART-CANNSTATT, GERMANY.

BAND-KNIFE SPLITTING-MACHINE.

1,033,892.      Specification of Letters Patent.      Patented July 30, 1912.

Application filed August 16, 1909. Serial No. 513,052.

*To all whom it may concern:*

Be it known that I, CARL ALBERT HIRTH, a citizen of the German Empire, residing at Stuttgart-Cannstatt, in the Kingdom of Wurttemberg, Empire of Germany, have invented certain new and useful Improvements in Band-Knife Splitting-Machines; and I do hereby declare the following to be a full, clear, and exact description of the invention, such as will enable others skilled in the art to which it appertains to make and use the same.

This invention relates to a machine having a band knife for splitting or cutting materials such as leather, felt, pasteboard or the like.

The novelty of the invention consists in that the mechanism for feeding forward the material is arranged on a frame, which may be turned and adjusted at right angles to the direction of movement of the band knife. By this arrangement the thickness of the part to be severed or split may be suitably adjusted and an oblique cut may be obtained, such as is desirable, for instance, in driving belts which are to be sewn together with the beveled ends overlapping.

The invention also allows of easy access to the band knife and the feeding mechanism.

Figure 1:
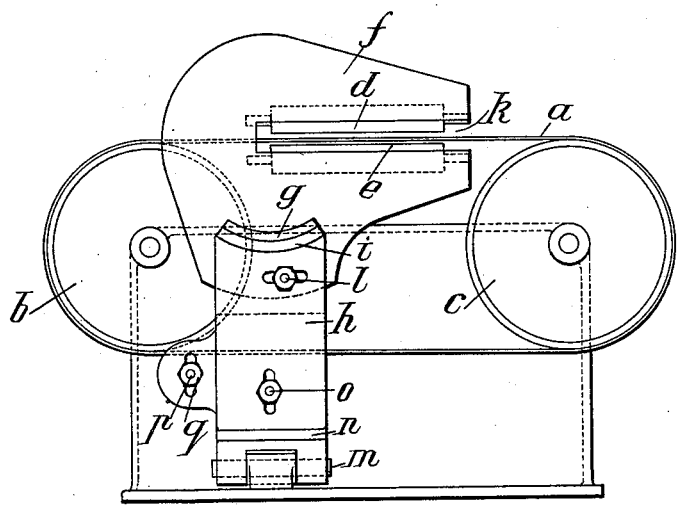
Figure 2:
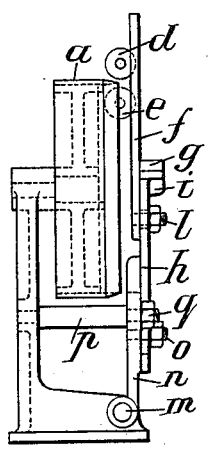

The invention is diagrammatically shown in one form of construction as an example in the accompanying drawings:—Figure 1 being a front view; and Fig. 2, a side view of the machine.

The band knife $a$ which is carried by pulleys $b$ $c$ supported on the machine frame, is arranged with its cutting edge opposite the mechanism for feeding or pushing forward the material to be cut, which mechanism consists, for instance, of two rollers $d$ $e$.

The feeding mechanism is according to this invention arranged so that it can be turned, and also adjusted as regards height. In the example of construction shown the feeding mechanism is carried by a plate $f$, which rests by means of an arched rib $g$ provided on it, on a suitably curved bar $i$ of a plate $h$. The plate $f$ is provided with a recess $k$ for allowing the workpiece to pass, and may be turned, and be fixed in its actual position by a clamp screw $l$. The plate $h$ is releasably mounted on a plate $n$ connected by a hinge $m$ with the machine frame and may be adjusted in height and fixed by the clamp screw $o$ in any suitable position, and the plates $h$ and $n$ constitute a support for the plate $f$ and for the feed rollers $d$, $e$. The plate $n$ is held fast or fixed on the machine frame by the bolt $p$ and nut $q$. When renewing the band knife or cleaning the feeding mechanism, the nut $q$ is unfastened, so that the plate together with the parts carried by it, may be tilted up causing the band knife and also the feeding device to be fully exposed or uncovered.

The adjustment of the plates $f$ and $h$ by means of slot and screw is preferably where, after the knife is once adjusted, it is to be used for a long time in the same way. Where a frequent change in the kind of workpiece to be operated on is to be expected, it is advisable to arrange the one plate, for instance, so as to be revoluble by means of a worm and worm wheel, on a carriage adapted to be vertically adjusted and fixed, which carriage, as usual, may be moved by means of a screw spindle or toothed wheel.

I declare that what I claim is:—

1. In a machine of the class described, a base; two pulleys supported by said base; a traveling band knife extending about said pulleys; a support hinged to said base; means for securing said support in a fixed position relative to said base; a pair of feed rollers; a plate whereby said feed rollers are carried, the same being secured to the upper end of said support; and means whereby said plate may be adjusted about an axis extending transverse to the plane of movement of said knife.

2. In a machine of the class described, a base; two pulleys supported by said base; a traveling band knife extending about said pulleys; a support hinged to said base, said support having an arched rib at its upper end; means for securing said support in a fixed position relative to said base; a pair of feed rollers; a plate whereby said feed rollers are carried, said plate having a curved bar adapted to coöperate with the arched rib upon said support; and means for securing said plate in position upon the upper end of said frame.

3. In a machine of the class described, a base; two pulleys supported by said base; a traveling band knife extending about said pulleys; a support hinged to said base, said support having an arched rib at its upper end, and means whereby the length of said support may be varied, means for securing said support in a fixed position relative to said base; a pair of feed rollers; a plate whereby said feed rollers are carried, said plate having a curved bar adapted to coöperate with the arched rib upon said support; and means for securing said plate in position upon the upper end of said frame.

In testimony whereof I affix my signature, in presence of two witnesses.

CARL ALBERT HIRTH.

Witnesses:
 JEAN GULDEN,
 HERMANN HOPPE.